US010102171B2

(12) United States Patent
Mangano et al.

(10) Patent No.: US 10,102,171 B2
(45) Date of Patent: Oct. 16, 2018

(54) METHOD OF HANDLING TRANSACTIONS, CORRESPONDING SYSTEM AND COMPUTER PROGRAM PRODUCT

(71) Applicants: STMicroelectronics (Grenoble 2) SAS, Grenoble (FR); STMicroelectronics S.r.l., Agrate Brianza (IT)

(72) Inventors: Daniele Mangano, San Gregorio di Catania (IT); Ignazio Antonino Urzi, Voreppe (FR)

(73) Assignees: STMicroelectronics (Grenoble 2) SAS, Grenoble (FR); STMIcroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 15/608,857

(22) Filed: May 30, 2017

(65) Prior Publication Data
US 2017/0270070 A1 Sep. 21, 2017

Related U.S. Application Data

(62) Division of application No. 14/219,850, filed on Mar. 19, 2014, now Pat. No. 9,697,161.

(30) Foreign Application Priority Data

Mar. 22, 2013 (IT) .............................. TO2013A0234

(51) Int. Cl.
G06F 13/40 (2006.01)
G06F 13/14 (2006.01)
G06F 15/78 (2006.01)

(52) U.S. Cl.
CPC .......... G06F 13/4027 (2013.01); G06F 13/14 (2013.01); G06F 15/7825 (2013.01);
(Continued)

(58) Field of Classification Search
CPC .......... G06F 13/12; G06F 13/14; G06F 13/16; G06F 13/1605; G06F 13/161;
(Continued)

(56) References Cited

U.S. PATENT DOCUMENTS 6,879,993 B1    4/2005  Crump
8,667,200 B1 *  3/2014  Muliadi ................ H04L 47/623
                                                   370/412
(Continued)

OTHER PUBLICATIONS

Ajanovic et al., "Multimedia and Quality of Service Support in PCI Express* Architecture," White Paper, Intel Research & Development, Sep. 19, 2002, 18 pages.
(Continued)

Primary Examiner — Thomas J Cleary
(74) Attorney, Agent, or Firm — Seed IP Law Group LLP

(57) ABSTRACT

A system, such as a System-on-Chip includes an interface component or PLUG which generates transactions over an IP block, such as an interconnect serving one or more clients via virtual channels. The client or clients are mapped onto the virtual channels via client/virtual channel mappings. The virtual channels are provided as a first set of virtual channels in the interface component which cooperate with a second set of virtual channels in the IP block. First and second client/virtual channel mappings for the first set of virtual channels and the second set of virtual channels are provided. The first and second client/virtual channel mappings are separately programmable and mutually decoupled from one another.

19 Claims, 6 Drawing Sheets

(52) U.S. Cl.
CPC ............... *G06F 2213/0038* (2013.01); *H04Q 2213/13399* (2013.01); *H04Q 2213/399* (2013.01)

(58) Field of Classification Search
CPC ........ G06F 13/20; G06F 13/36; G06F 13/362; G06F 13/40; G06F 13/4004; G06F 13/4022; G06F 13/4027; G06F 13/404; G06F 9/5077; G06F 15/7807; G06F 15/7825; G06F 2213/0038; H04L 45/586; H04Q 2213/13399; H04Q 2213/399
See application file for complete search history.

(56) References Cited

U.S. PATENT DOCUMENTS

| | | |
|---|---|---|
| 2005/0063394 A1 | 3/2005 | Ko |
| 2005/0198601 A1 | 9/2005 | Kuang et al. |
| 2008/0049762 A1 | 2/2008 | Burchard et al. |
| 2010/0014535 A1 | 1/2010 | Sherman et al. |
| 2012/0072678 A1 | 3/2012 | Biswas et al. |
| 2012/0219014 A1 | 8/2012 | Glaeser |
| 2014/0254388 A1 | 9/2014 | Kumar et al. |
| 2015/0188847 A1 | 7/2015 | Chopra et al. |

OTHER PUBLICATIONS

Cesário et al., "Multiprocessor SoC Platforms: A Component-Based Design Approach," *IEEE Design & Test of Computers* 19(6):52-63, 2002.

Italian Search Report, dated Oct. 1, 2013, for corresponding Italian Application No. TO20130234, 3 pages.

Mangano et al., "Enabling Dynamic and Programmable QoS in SoCs," Third International Workshop on Network on Chip Architectures, NoCArc '10, Atlanta, Georgia, Dec. 4-5, 2010, 6 pages.

Shim et al., "Static Virtual Channel Allocation in Oblivious Routing," Third ACM/IEEE International Symposium on Networks-on-Chip, NoCS 2009, La Jolla, CA, May 10-13, 2009, 6 pages.

\* cited by examiner

METHOD OF HANDLING TRANSACTIONS, CORRESPONDING SYSTEM AND COMPUTER PROGRAM PRODUCT

BACKGROUND

Technical Field

The disclosure relates techniques involving transactions over an intellectual property (IP) block serving one or more clients. One or more embodiments may apply to traffic injection virtualization, e.g., in System-on-Chip (SoC) technology.

Description of the Related Art

The growing complexity of applications running on modern SoCs and the desired flexibility of these devices stimulate an increasing interest for solutions offering the possibility to configure several features in a "post-silicon" step by programming the SoC through dedicated registers.

Complex SoCs embed several hardware and software IPs each implementing one or more specific functions.

These IPs may interface with the SoC interconnect through a specific interface component responsible for properly generating bus transactions with proper address, shape, etc. Such an interface component may be generically called a PLUG.

BRIEF SUMMARY

In such a context, the need may be felt for solutions offering one or more of the following advantages:
- flexible mapping between clients and virtual channels (VCs): each client may be mapped on a particular virtual channel depending on its QoS requirements;
- efficient internal PLUG Virtual Channel or VC implementation: the PLUG may implement all (and only) those VCs needed to support all the required service classes;
- support for post-silicon configuration by software: the user/application may be able to program the virtualization required for the specific use case;
- reduced cost in terms of hardware complexity (e.g., silicon area): the system may support a large number of VCs and the PLUG may be able to support all the VCs involved at a reasonable cost.

Various embodiments herein have the object of meeting such a need, thus improving capabilities of prior art arrangements as discussed in the foregoing.

The disclosure may also relate to a corresponding system (e.g., a SoC) as well as to a computer program product, loadable into the memory of at least one computer and including software code portions adapted to perform the steps of the method when the product may be run on at least one computer. As used herein, such a computer program product is intended to be equivalent to a computer readable medium containing instructions for the control of the computing system, so as to coordinate the execution of the method according to the disclosure. The reference to "at least one computer" is meant to highlight the possibility for embodiments to be implemented in a modular and/or may be distributed form.

The claims may be an integral part of the technical teachings provided herein.

One or more embodiments may offer a solution to allow flexible and programmable mapping of intellectual property (IP) block traffic onto virtual channels implemented by a system (e.g., interconnect and memory sub-system) and to implement virtual channels at PLUG level (e.g., in the component responsible for bus transactions generation) at a reduced cost.

One or more embodiments may apply to System-on-Chip products targeting, e.g., multimedia applications.

One or more embodiments may find use in multiple parallel processes having different performance requirements and sharing some hardware resources such as on-chip memories, external DDR memories, on-chip infrastructure, etc.

An idea underlying one or more embodiments may be embedding in a PLUG a set of specific hardware resources and configurability services which may allow flexible and programmable traffic virtualization paying a reduced cost in terms of silicon.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not intended to convey any information regarding the actual shape of the particular elements and have been solely selected for ease of recognition in the drawings. Embodiments will now be described, by way of example only, with reference to the annexed figures, wherein.

DETAILED DESCRIPTION

In the following description, numerous specific details may be given to provide a thorough understanding of exemplary embodiments. The embodiments can be practiced without one or more of the specific details, or with other methods, components, materials, etc. In other instances, well-known structures, materials, or operations may be not shown or described in detail to avoid obscuring aspects of the embodiments. Reference throughout this specification to "one embodiment" or "an embodiment" means that a particular feature, structure, or characteristic described in connection with the embodiment may be included in at least one embodiment. Thus, the appearances of the phrases "in one embodiment" or "in an embodiment" in various places throughout this specification may be not necessarily all referring to the same embodiment. Furthermore, the particular features, structures, or characteristics may be combined in any suitable manner in one or more embodiments.

The headings and references provided herein may be for the convenience of the reader only and do not interpret the scope or meaning of the embodiments.

A possible scenario of use of one or more embodiments may be a system such as, e.g., a System-on-Chip (SoC) wherein intellectual property (IP) blocks may interface with the SoC interconnect through a PLUG which may be responsible for properly generating bus transactions with proper address, shape, etc.

Figure 1:
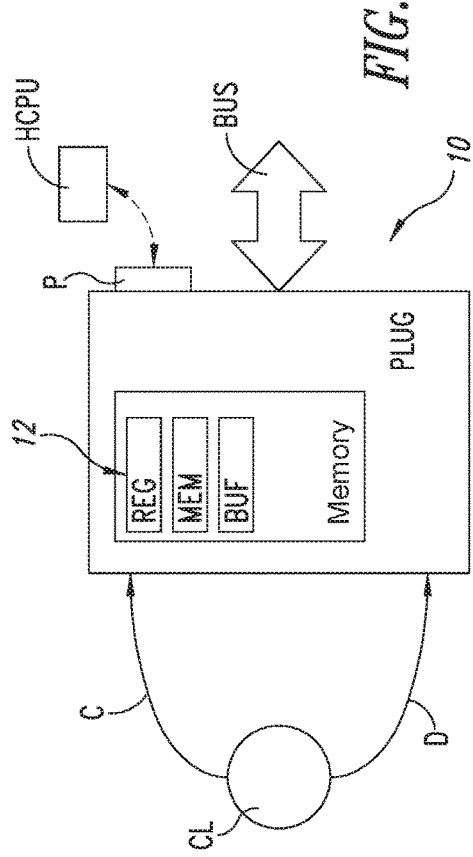
FIG. 1 schematically represents PLUG component interfaces.

FIG. 1 shows the interfaces of an exemplary interface component 10 (e.g., a so-called PLUG) which may be dedicated to one client CL, e.g., to an IP block port provided with a pair of interfaces: Command C and Data D.

The command interface C may permit the client (e.g., an IP) to program the transfer of information with respect to the PLUG 10: start address, end address, addressing scheme, transfer size, etc. The data interface D may permit the client CL to write/read data into/from the PLUG 10.

A programming interface P may provide (e.g., to a host CPU indicated HCPU) access to the internal register 12 of the PLUG 10 in order to ensure that at least some PLUG features may be programmable by software.

In one or more embodiments, e.g., for optimization reasons, a same PLUG 10 may be shared by multiple clients (e.g., ports of the same IP block or ports of separate IP blocks).

In one or more embodiments, clients connected to a same PLUG may have different Quality-of-Service (QoS) requirements, and the PLUG component 10 may support multiple service classes.

In one or more embodiments, a PLUG 10 may embed a memory to allow the implementation of buffering for collecting the data transferred (e.g., written or read) in an associated system.

With multiple clients grouped on a same PLUG 10, a buffer may be reserved for each client, with such a buffer allocated, e.g., onto a physical memory which may be shared by the clients involved.

Figure 2:
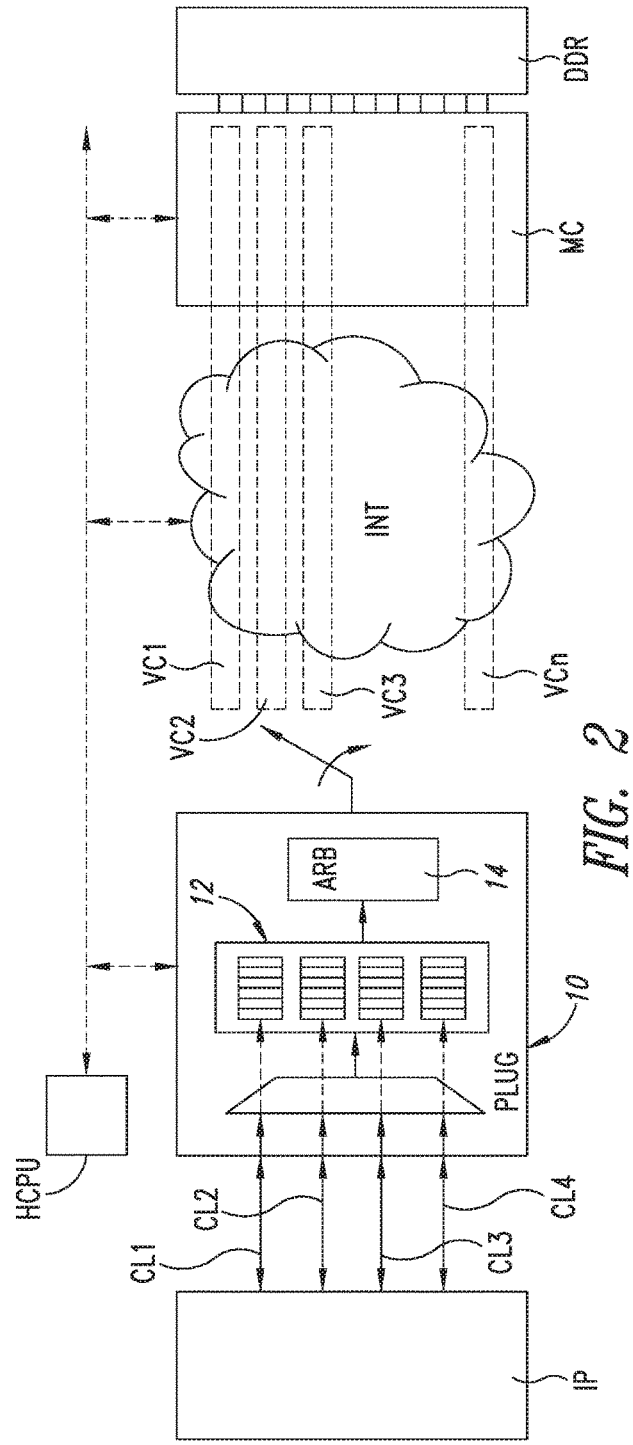
FIG. 2 is an exemplary diagram of a 4-client PLUG in a system with multiple virtual channels.

FIG. 2 shows an exemplary arrangement where, e.g., in order to achieve a given level of Quality-of-Service (QoS) a system implements a plurality of virtual channels VC1, VC2, VC3, . . . , VCn over an interconnect INT including, e.g., one or more buses. Such an exemplary system may include a PLUG 10 serving, e.g., four clients CL1, CL2, CL3, CL4 which are shown as parts of a set of IP blocks collectively designated as IP.

In the representation of FIG. 2, references and numerals identical to those already appearing in FIG. 1 may be used to designate parts or elements identical or equivalent to those already described in connection with FIG. 1 so that the corresponding description will not be repeated here.

The representation of FIG. 2 is substantially functional in that, in one or more embodiments, the PLUG functionality 10 may be itself included in the set of IP blocks. Also, in addition or as an alternative to the interconnect INT (e.g., an on-chip interconnect) serving a memory controller, e.g., for a double data rate (DDR) memory block, the system may include any other type of IP blocks.

In one or more embodiments, virtual channels VCs (e.g., VC1, VC2, VC3, . . . , VCn) at the system level may implement a specific QoS service class; the mapping between clients and VCs may depend on the application scenario.

For instance, in a multimedia SoC, the clients/VCs mapping for, e.g., video use may be different from the clients/VCs mapping for, e.g., gaming.

One or more embodiments may thus relate to a system including an interface component (e.g., the PLUG 10) generating transactions over an IP block, such as an interconnect INT, serving at least one or more clients CL1, CL2, . . . via virtual channels wherein the one or more clients CL1, CL2, . . . are mapped onto the virtual channels via client/virtual channel mappings.

In one or more embodiments as exemplified in FIG. 2, the PLUG 10 may permit flexible clients/VCs mapping depending on the specific use, while also implementing in an efficient manner the VCs (i.e., service classes) for the system.

In so doing, one or more of the following factors may be taken into account.

A number K of programmable virtual channels may be implemented in the PLUG 10. These virtual channels may be called Internal Virtual Channels (IVCs) to differentiate them from virtual channels (VCs) at the system level, which in the following will be referred to as System Virtual Channels (SVCs). In one or more embodiments the number (K) of IVCs may be selected to correspond to the (e.g., minimum) number adapted to serve the clients connected to the PLUG 10. Thanks to its programmability, an IVC may implement a particular service class. In other words, a same IVC may correspond to different SVCs depending on the application scenario.

In one or more embodiments, a flexible and programmable grouping of N clients into K IVCs and M SVCs may be supported by the system. In one or more embodiments the mapping Clients/IVCs may be decoupled from the mapping Clients/SVCs and both mappings may be (separably) programmable. The effect of the mapping Clients/SVCs may be that an SVC tag may be propagated on the bus along with the transaction, so that the traffic can be mapped on the proper SVC at the system level. This, possibly together with the aspect considered above, may lead to a flexible virtualization solution allowing implementation of a variety of QoS requirements with reduced cost.

One or more embodiments may thus involve providing the virtual channels as a first set of virtual channels, e.g., the internal virtual channels IVC1, IVC2, . . . in the interface component (e.g., the PLUG 10) cooperating with a second set of virtual channels SVC1, SVC2, . . . , e.g., the system virtual channels in the interconnect INT.

One or more embodiments may involve providing first client/virtual channel mappings Clients/IVCs for the first set of (internal) virtual channels IVC1, IVC2, . . . in the interface component 10 and second client/virtual channel mappings Clients/SVCs for the second set of (system) virtual channels SVC1, SVC2, . . . in an IP block as exemplified by the interconnect INT.

In one or more embodiments, the first client/virtual channel mappings Clients/IVCs and the second client/virtual channel mappings Clients/SVCs may be decoupled from one another and separately programmable.

One or more embodiments may involve identifying a lower threshold number of virtual channels required for serving the clients CL1, CL2, . . . and selecting the number of the internal virtual channels in the first set IVC1, IVC2, . . . equal to the lower threshold number thus identified.

In one or more embodiments, the interface component (e.g., the PLUG 10) may generate transactions over the IP block (e.g., the interconnect INT) to serve a plurality of clients CL1, CL2, . . . and the number of the internal virtual channels in the first set of virtual channels IVC1, IVC2, . . . is selected to be less than the number of the clients CL1, CL2, . . . ).

In one or more embodiments, the interface component (e.g., the PLUG 10) may generate transactions over an IP block (e.g., the interconnect INT) to serve a plurality of clients CL1, CL2, . . . and the first client/virtual channel mappings may map multiple clients CL1, CL2, . . . onto one virtual channel in the set of internal virtual channels IVC1, IVC2, . . . ; the multiple clients mapped onto one virtual channel may be subjected to arbitration.

In one or more embodiments, a programmable and low-cost Weighted Least Recently Used (WLRU) arbitration procedure may be used for clients mapped on the same IVC.

Figure 3:
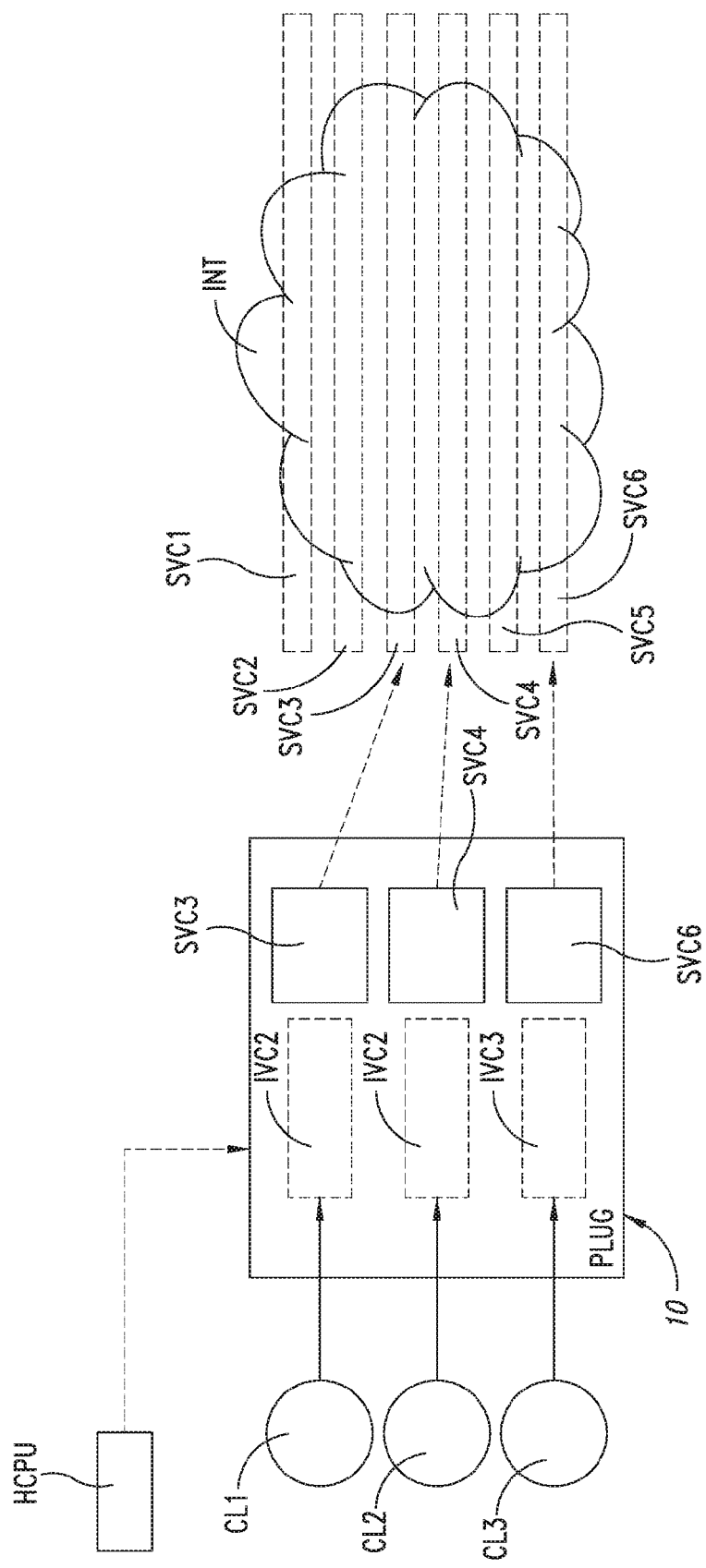
FIG. 3 shows a virtualization example, FIG. 4 includes two portions designated a) and b), respectively, which show virtualization examples.

FIG. 3 shows an example of virtualization which may be implemented with the approach described in the foregoing. In the example of FIG. 3 there may be, e.g., 6 virtual channels at the system level (SVC1, SVC2, SVC6), while the PLUG 10 may group, e.g., three clients CL1, CL2 and CL3.

Assuming an exemplary case (e.g., worst case) where the three clients may have different QoS requirements, three internal virtual channels IVC1, IVC2, IVC3 may be enough at the PLUG level. If QoS requirements for the clients change from one use case to another, the IVCs can be re-programmed accordingly (e.g., to implement a different service class).

In one or more embodiments, the number of IVCs may be less than the number of clients. This may happen, e.g., when multiple clients may be mapped on the same IVC: in that case, arbitration within the IVC may be performed by means of the WLRU approach.

In the example of FIG. 3, the IVCs (e.g., IVC1, IVC2, IVC3) may be programmed to implement the service classes for clients CL1, CL2 and CL3 (e.g., service classes which may be generically called blue, green and red), respectively. The same service classes may be respectively implemented by SVC3, SVC4 and SVC6.

As a consequence, in one or more embodiments, the PLUG 10 may be programmed, e.g., with the following mappings:
C1/IVC1, C1/SVC3
C2/IVC2, C2/SVC4
C3/IVC3, C3/SVC6
that is by giving rise to a virtualization scheme which may be described, e.g., as:
IVC1=Blue, IVC2=Green, IVC3=Red
C1/IVC1/SVC3, C2/IVC2/SVC4 C3/IVC3/SVC6.

No need therefore subsists in such an exemplary embodiment to support six VCs in the PLUG.

Of course, the virtualization scheme may be changed completely on a (use) case-by-case basis.

Figure 4:
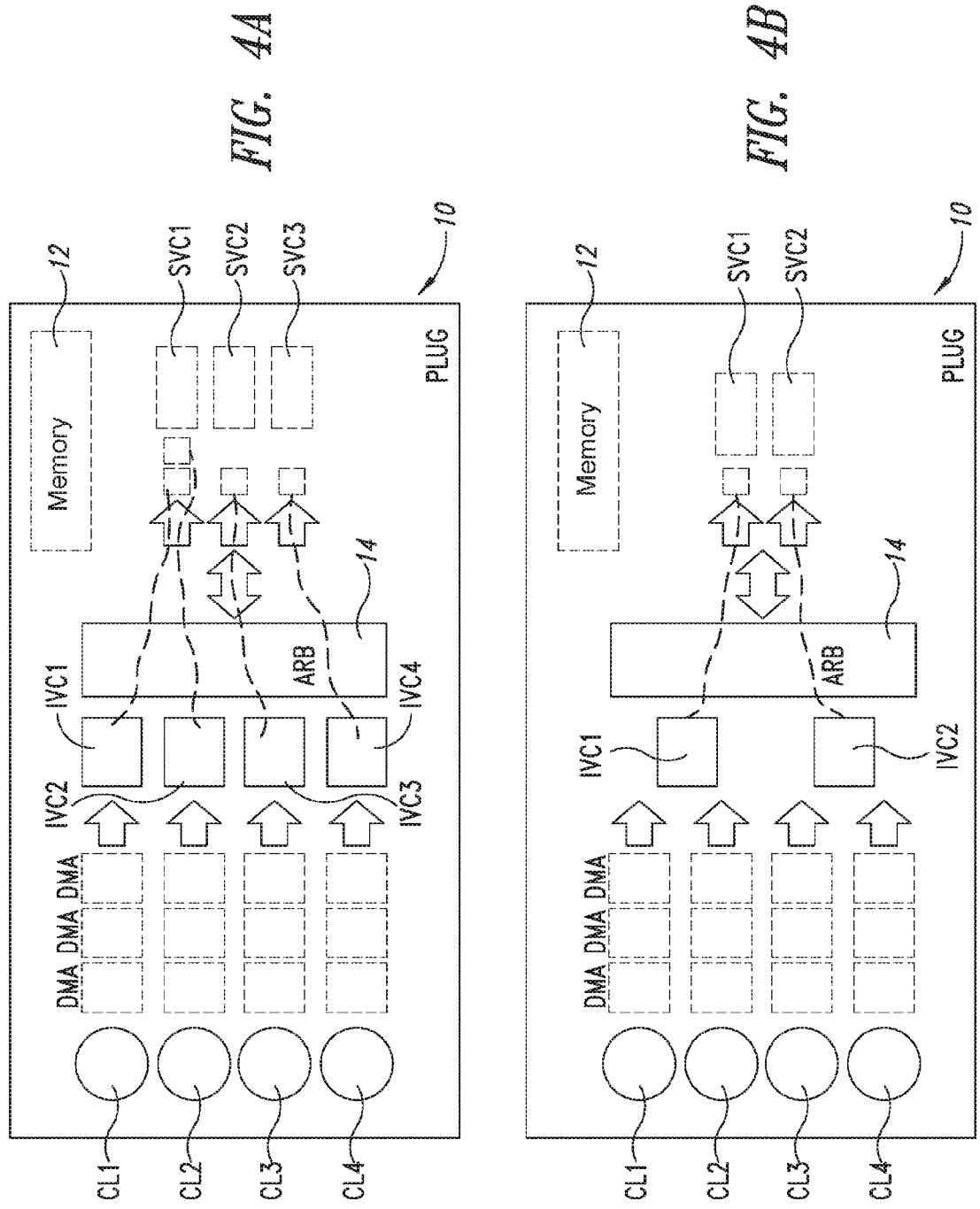

Portions a) and b) of FIG. 4 show two further examples of virtualization.

The former example (FIG. 4a) is exemplary of an N×N×M virtualization, i.e., a case with N clients, N IVCs and M SVCs.

The example shown in FIG. 4a may involve:
four clients CL1, CL2, CL3, and CL4,
four IVCs, namely IVC1, IVC2, IVC3 and IVC4,
three SVCs, namely SVC1, SVC2 and SVC3.

In the example shown, e.g., the first and second clients CL1 and CL2 may be mapped (e.g., via an arbiter 14) onto separate IVCs but onto the same SVC, while the remaining two clients CL3, CL4 may be mapped onto separate IVCs and onto separate SVCs.

The latter example (FIG. 4b) is exemplary of N×K×K virtualization, where there may be the same number of IVCs and SVCs and the number of clients may be different.

The example shown in FIG. 4b may involve:
again, four clients CL1, CL2, CL3, and CL4,
two IVCs, namely IVC1 and IVC2,
two SVCs, namely SVC1 and SVC2.

In this latter case the internal virtual channels (IVCs) may be consistent with the system virtual channels (SVCs).

In various embodiments, any possible combination of IVCs mapping and SVCs mapping (as stored, e.g., in the registers 12) are possible and may be selected by software.

Figure 5:
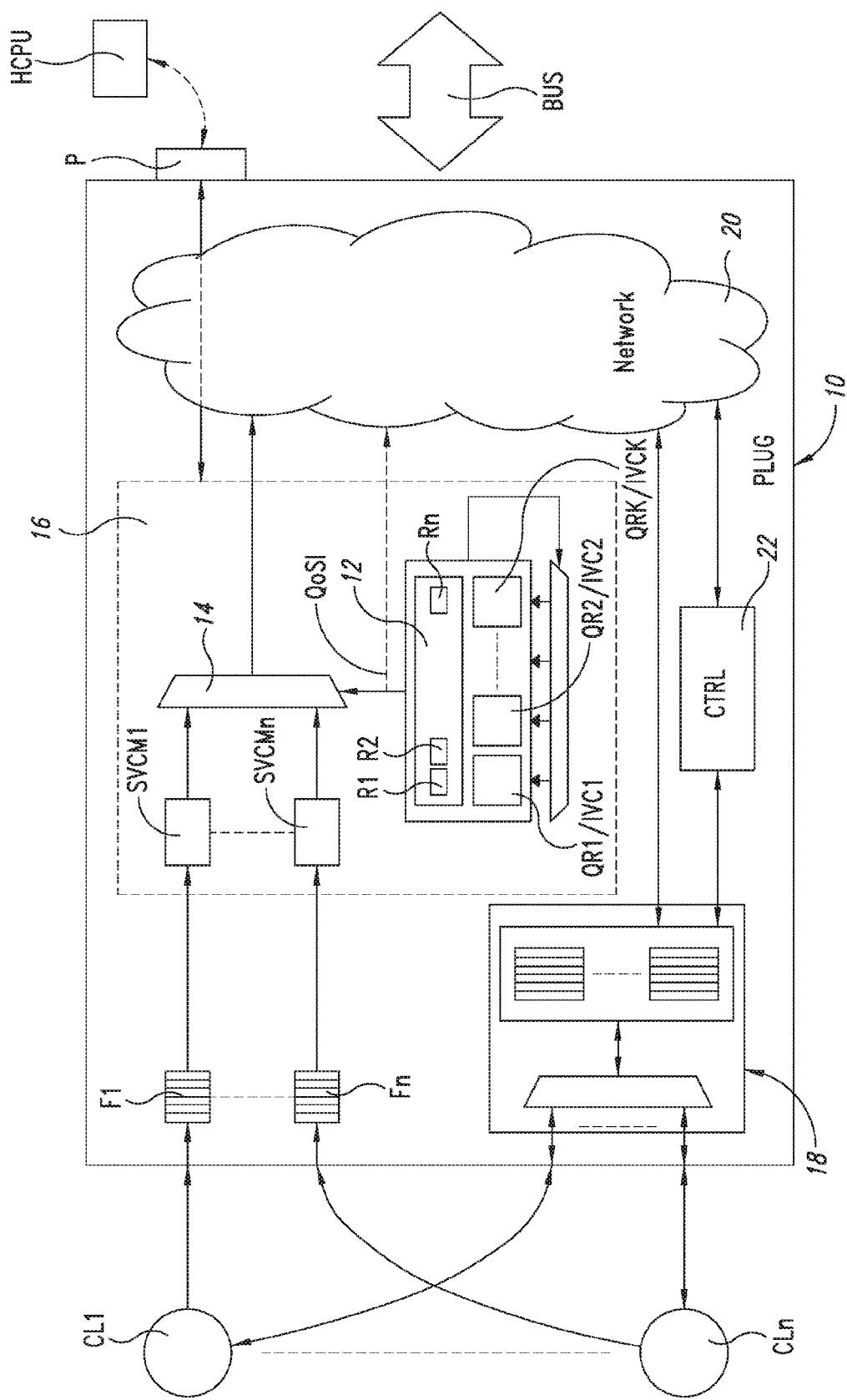
FIG. 5 is a diagram of an exemplary virtualization architecture.

As shown in FIG. 5 (which may be referred to the basic layout of FIG. 1), a component implementing any of the exemplary virtualization approaches discussed in the foregoing may be a virtualization unit 16, including, in addition to the arbiter 14:
QoS Resources (QR1, . . . , QRk) adapted to implement the IVCs, e.g., IVC1, . . . , IVCk;
SVC Mappers (SVC M1, . . . , SVC Mn).

Registers included among the registers 12 of the PLUG 10 as associated to the virtualization unit 16 may not be shown in FIG. 5 (only those related to WLRU arbitration procedure, namely R1 to Rn may be visible).

In one or more embodiments, each of the blocks QR1, . . . , QRk may be responsible for the generation of the QoS information QoSI associated to the corresponding IVC. In one or more embodiments, the blocks QR1, QRk embed a set of registers for programming the internal virtual channels (IVCs) with the service classes as desired.

In one or more embodiments, the QoS information QoSI may include both IVC and client information. As better detailed in the following, in one or more embodiments, once a certain IVC may be identified, client QoS info may be required to identify the winning client between those belonging to the identified IVC.

For example, parameters identifying a service class may be one (or both) of a bandwidth and a target latency. Moreover, the information QoSI may be indicative of a priority value generated according to one of the following options:
a) a function of the difference between the programmed target bandwidth and the corresponding measured bandwidth;
b) a function of the difference between the programmed target latency and the measured latency (e.g., average round-trip latency of transactions).
c) a function of both the difference between the programmed target bandwidth and measured bandwidth, and the difference between programmed latency and measured latency.

A weight assigned to each one of these two differences may be an additional QR(/IVC) parameter to configure the service class.

In various embodiments, various possible approaches may be applied to this technique to configure the service classes and to generate the information QoSI.

In one or more embodiments, the PLUG registers (e.g., the QR registers) may be accessible by means of the programming interface P (Prog I/F).

In one or more embodiments, a de-multiplexing logic 18 may select the QR module associated with a certain IVC; this may permit to update the state of the proper QR (in the example made previously, the state may be defined, e.g., in terms of measured bandwidth and measured latency) and, consequently, the priorities provided to the arbiter.

In one or more embodiments, the arbiter 14 may select the winner client from the SVC Mappers (SVC M1, . . . , SVC Mn). This may occur under the control of registers F1, . . . , Fn in the command interface C and as a function of the information QoSI generated on the basis of a procedure as exemplified in the flow chart of FIG. 6.

The reference 20 is indicative of an exemplary logical network which oversees (according to known criteria) traffic generation and control by the PLUG 10. Reference 22 denotes a control module (e.g., FIFOs CTRL) interposed between the de-multiplexing logic 18 and the network 20.

In one or more embodiments, a certain ("winning") IVC may be selected by looking at the QR outputs. Assuming that the output of a QR (e.g., QR1, QR2, . . . , QRk) may be, e.g., a priority—as in the example made before—the IVC thus selected may simply be the one with highest priority. Once a certain IVC may be identified, exemplary criteria for selecting a winning client may be, e.g.:
- if, according to the Clients/IVCs mapping programmed onto dedicated registers, only one client may be mapped onto a certain IVC, that only client may be the winner;
- if, according to the Clients/IVCs mapping programmed onto dedicated registers, multiple clients may be mapped onto a certain IVC, the winning client may be selected according to, e.g., the WLRU procedure stored in the registers R1, . . . , Rn.

In one or more embodiments, the information QoSI input to the arbiter 14 may include, e.g.:
- the priority (or any other variable) associated to each IVC by the QRs;
- the priority (or any other variable) associated to each client by the WLRU arbitration.

Such an arbitration procedure may be performed each time that a transfer ends and there may be, e.g., at least two pending transfer requests (as used herein, "transfer" may mean the elementary entity used to perform arbitration, e.g., packet, burst, etc.). In one or more embodiments, as schematically represented in the block diagram of FIG. 5, the SVC mapper modules SVC M1 to SVC Mn may associate a SVC tag to each client CL1, . . . , CLn according to the Clients/SVCs mapping programmed onto dedicated registers.

In one or more embodiments beyond SVC, if required, additional QoS information may be mapped onto bus transactions.

In one or more embodiments, a Weighted Least Recently Used (WLRU) arbitration procedure may be applied among clients CL1, CL2, . . . belonging to the same internal virtual channel IVC1, IVC2, . . . , that is the clients that may be associated to the same QR.

In one or more embodiments, WLRU arbitration may offer to the user the possibility of configuring by software, e.g., the bandwidth ratio for each client by means of low-cost hardware support.

In one or more embodiments, for a given internal virtual channel IVC1, IVC2, . . . the subset of clients participating to the arbitration may be identified on the basis of the clients/IVCs mapping defined by the user.

Ratios may be adopted to define the way in which the available bandwidth is distributed to these clients.

For instance, the bandwidth allocated by QRk for an internal virtual channel IVCk may be Bk and, e.g., four clients may be mapped onto IVCk with the ratios R1, R2, R3 and R4. The bandwidth distribution achieved by the WLRU ideally may be calculated, e.g., as follows:

$B1 = (R1/TR) \cdot Bk$ $B2 = (R2/TR) \cdot Bk$ $B3 = (R3/TR) \cdot Bk$ $B4 = (R4/TR) \cdot Bk$ where TR=R1+R2+R3+R4.

The ratio may be programmed, e.g., onto dedicated registers.

In one or more embodiments, if a client X has a ratio Rx and a client Y has a ratio Ry, the ratio between the bandwidth for these clients may be always Rx/Ry, independently on the available absolute bandwidth.

In various embodiments, no direct relationship may exist between the transactions size and the ratios that can be programmed. For instance—by way of non-limitative example—one may assume that the highest value specified for the ratio parameter may be 16.

In one or more embodiments, WLRU implementation and operation may be based on a set of counters (one counter per client) C={C1, C2, . . . , Ck}, where k may be the number of clients mapped onto the specific internal virtual channel for which WLRU arbitration may be applied.

These counters may be initialized with the ratio values as specified by the user C[0]={C1[0]=R1, C2[0]=R2, . . . , Ck[0]=Rk} and their outputs may be used as credits information (priorities). Clients which may be active at a given time may be those requesting access to the bus.

Figure 6:
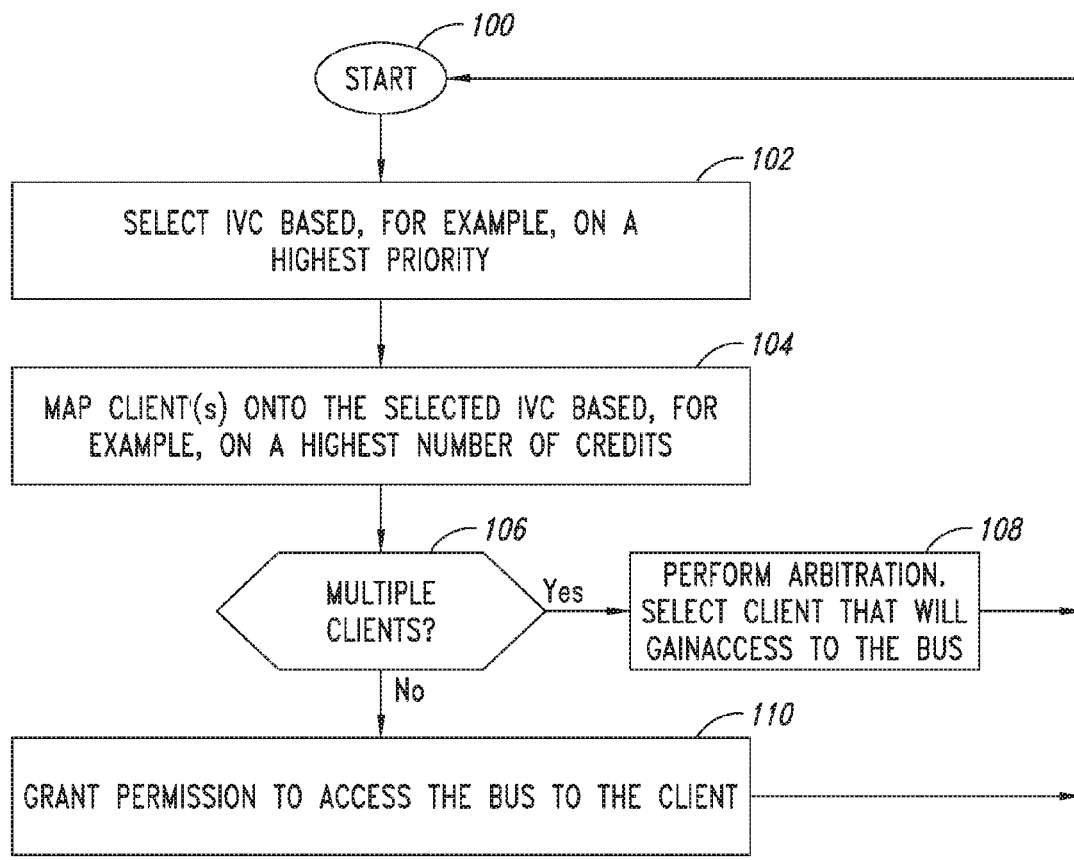
FIG. 6 is a flowchart of an exemplary arbitration procedure.

By referring to the flow chart of FIG. 6, in a non-limiting example a corresponding procedure may be summarized as follows.

After a start step 100, each time a certain IVC may be selected in a step 102 (e.g., as the one with highest priority), in a step 104 the client(s) mapped onto the IVC may be selected, e.g., out of the active clients having a highest number of credits.

A step 106 aims at checking if there is only one client mapped on the "winner" IVC or not.

If there are multiple clients mapped on that IVC, an (e.g., WRLU) arbitration scheme will is applied; otherwise this may not be required (credits may be considered only when applying WLRU).

If there may be two or more active clients with a highest number of credits (positive outcome, Y=YES, of step 106), a positional arbitration policy may be applied to grant a WRLU winner (step 108) and processing returns to the start step 100.

If there is only one active client with a highest number of credits (negative outcome, N=NO, of step 106) the identified client is granted and processing again returns to the start step 100.

In one or more embodiments, when a client may be granted (step 108), a corresponding credit counter may be decremented by 1 in the case of Write transfer and by N in the case of Read transfer, where N may be given by the ratio transfer_size/bus_size (value of at least 1).

In one or more embodiments, for a write transfer, when one of the credit counters may approach the zero value, all and only the active counters may be incremented by the corresponding ratio. For instance, if at time n there may be two active clients X and Y with credits Cx[n]=1 and Cy[n]=1, and client X may be arbitrated, at time n+1 credits will be updated as follows Cx[n+1]=Rx and Cy[n+1]=1+Ry, where Rx and Ry may be the ratios of the two clients.

In one or more embodiments, for a read transfer, when decrementing a credit counter, if N (which may be given by the ratio transfer_size/bus_size) is greater than credits, all and only the active counters may be incremented according to the following formulas, which may be a generalization of the mechanism just described for a Write transfer:

$Cx[n+1] = Cx[n] - N + K*Rx$ and $Cy[n+1] = Cy[n] + K*Ry$

Here Cx may be the credit counter of the winner client, Cy may be the credit counter of an arbitrary active client and the amount K may be such that once multiplied by Rx, it may ensure that Cx[n+1] may be greater than 0. The amount K may be calculated once for all the clients.

Figure 7:
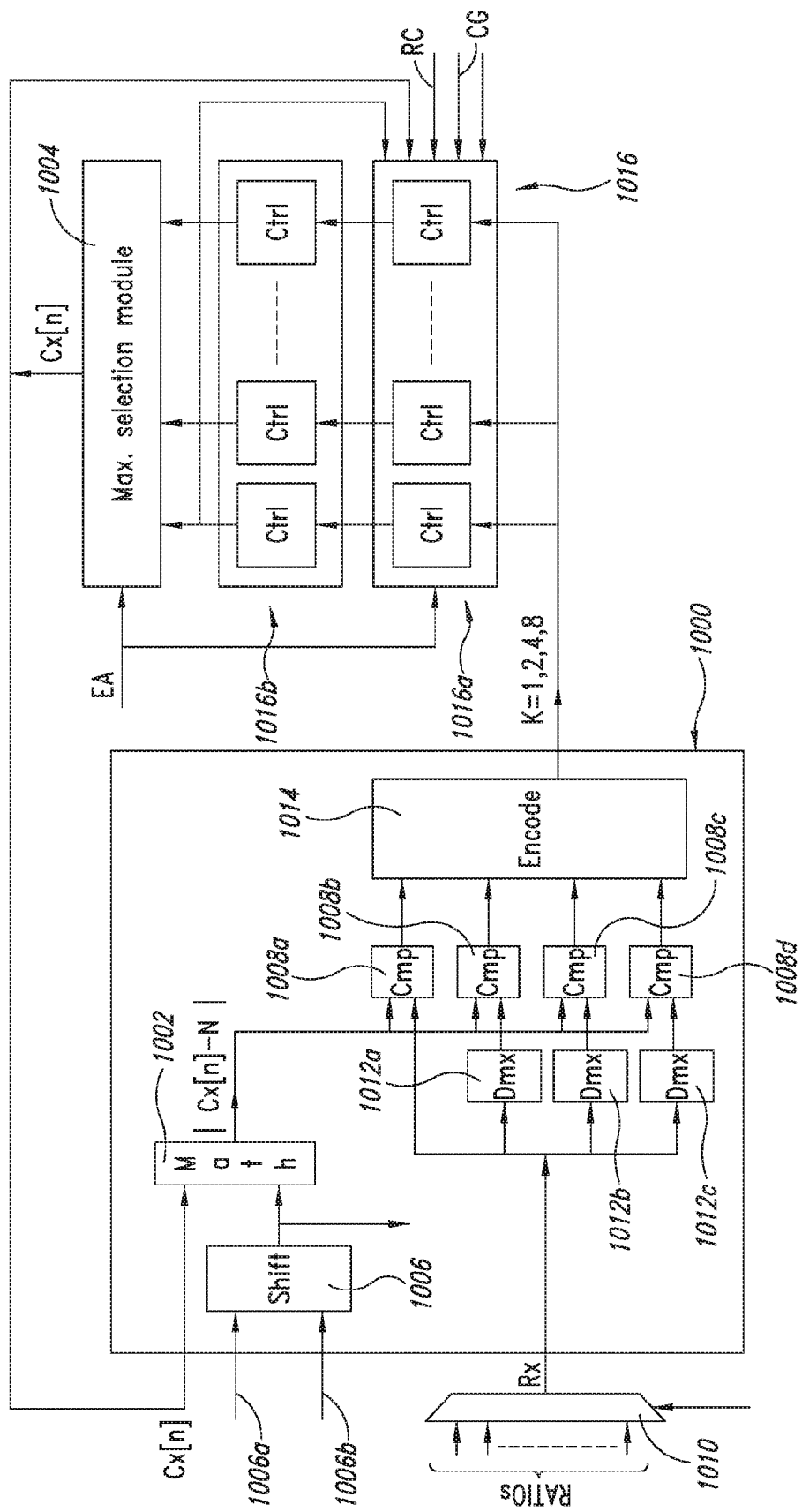
FIG. 7 is a block diagram of an exemplary implementation of an arbitration procedure.

FIG. 7 shows an exemplary functional diagram on an embodiment including a module 1000 for computing K including a module 1002 wherein the absolute value of the amount Cx[n]−N may be calculated starting from the value for Cx[n] as provided by a maximum selection module 1004 (as better detailed in the following) and the value for N as provided by a shift module 1006 sensitive to the transfer size and to the (hard wired) size on input lines 1006a and 1006b, respectively.

In a set of comparators 1008a to 1008d, the absolute value |Cx[n]−N| is compared with Rx, Rx*2, Rx*4 and Rx*8 (in this non-limiting example K can be 1, 2, 4, 8).

In the exemplary embodiment shown in the drawing, Rx is received from a module (demux) 1010 which selects the winner out of plural ratios as defined in the foregoing, while 1012a, 1012b and 1012c are :2, :4, and :8 dividers.

The result of the comparison in the set of comparators 1008a to 1008d may then be encoded at 1014 to identify the lowest multiplier that ensures Cx[n+1] may be positive.

Finally, the references 1016a denote control registers CRTL1, . . . , CTRLk which receive information on the requestor clients RC and the client grants CG. The control registers 1016a may operate under the control of an Enable Arbitration command EA and may in turn control operation of a set registers 1016b (C1, C2, . . . , Ck) whose output are fed to the selector for the winner (e.g., Max Selection) 1004 which provides Cx[n].

In a non-limiting example, a highest value of 8 for K may ensure that Cx[n+1] may be positive even if the ratio may be 1, transfer size may be 64B and bus size may be 8B (the highest value of K depends on a selected largest transfer size and on the bus size).

An assumption in an exemplary Read case may be that the transfer size may be equal or bigger than the bus size. The event that this may not be the case, may be taken into account when programming the ratio: for instance, in case of a 16B bus interface and 8B transfers, the bus efficiency may be 50% and a value programmed in the register to yield Rp=2Ra may achieve an actual ratio of Ra.

One or more embodiments may provide a flexible approach allowed to cover a wide range of use cases by post-silicon software programming with reduced cost and/or a protocol-independent solution applicable for a wide range of IP blocks/Systems.

Of course, without prejudice to the underlying principles of the invention, the details and the embodiments may vary, even appreciably, with respect to what has been described by way of example only, without departing from the extent of protection.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
an interface component;
an IP block having a message transfer interface block, the IP block associated with a plurality of N clients;
a logical network, the logical network configurable as a plurality of virtual channels, the plurality of virtual channels including a first set of internal virtual channels in said interface component and a second set of system virtual channels in said IP block, the first set of internal virtual channels and second sets of system virtual channels configured for separate programming;
an arbitration unit configured to apply an arbitration procedure to a plurality of data transfers, each data transfer associated with a different client, when the plurality of data transfers are communicated via the same internal virtual channel;
at least one quality of service block associated with each internal virtual channel, each quality of service block having a plurality of registers associated with the arbitration procedure; and
a virtualization unit having the at least one quality of service block and at least one service mapper logic unit, wherein each virtual channel of the plurality of virtual channels is associated with a designated quality of service logic block, wherein each individual client of the plurality of N clients is associated with an individual service mapper logic unit, and wherein each quality of service logic block is arranged to provide selection information that prioritizes one of the plurality of N clients.

2. The system of claim 1, wherein the arbitration procedure is a weighted least recently used (WLRU) arbitration procedure.

3. The system of claim 2, wherein the plurality of registers associated with the WLRU arbitration procedure are arranged to store parameters associated with at least one of a bandwidth and a target latency.

4. The system of claim 3, comprising:
demultiplexing logic to select one of the at least one quality of service blocks, the selection based on a value in at least one of the stored parameters.

5. The system of claim 3, comprising:
a plurality of counters wherein in at least one counter is associated with each of the N clients, the counters arranged to decrement and increment based on respective read and write operations associated with the N clients.

6. The system of claim 2, wherein the plurality of registers associated with the WLRU arbitration procedure are arranged to store at least one parameter associated with a bandwidth, and wherein the WLRU arbitration procedure is arranged to generate a priority value according to a difference between a programmed target bandwidth and a measured target bandwidth.

7. The system of claim 2, wherein the plurality of registers associated with the WLRU arbitration procedure are arranged to store at least one parameter associated with a target latency, and wherein the WLRU arbitration procedure is arranged to generate a priority value according to a difference between a programmed target latency and a measured target latency.

8. The system of claim 2, wherein the plurality of registers associated with the WLRU arbitration procedure are dynamically re-programmable.

9. The system of claim 8, comprising:
a programming interface, wherein the plurality of registers associated with the WLRU arbitration procedure are user re-programmable via the programming interface.

10. A method of arbitrating traffic between a plurality of clients, comprising:
  providing an interface component;
  providing an IP block having a message transfer interface block, the IP block associate with the plurality of clients;
  providing a plurality of virtual channels in a logical network, the plurality of virtual channels including a first set of internal virtual channels in said interface component and a second set of system virtual channels in said IP block;
  separately programming the first set of internal virtual channels and the second set of system virtual channels;
  with an arbitration unit, applying an arbitration procedure to a plurality of data transfers, each data transfer associated with a different client, when the plurality of data transfers are communicated via the same internal virtual channel; and
  providing, with a virtualization unit, selection information that prioritizes traffic between ones of the plurality of clients, wherein the virtualization unit has at least one quality of service block and at least one service mapper logic unit, wherein each virtual channel of the plurality of virtual channels is associated with a designated quality of service logic block, wherein each individual client of the plurality of clients is associated with an individual service mapper logic unit, and wherein each designated quality of service logic block is arranged to provide selection information that prioritizes one of the plurality of clients.

11. The method of claim 10, wherein the arbitration procedure is a weighted least recently used (WLRU) arbitration procedure.

12. The method of claim 11, comprising:
  storing in a plurality of registers associated with the WLRU arbitration procedure at least one of a bandwidth and a target latency.

13. The method of claim 10, comprising:
  based on respective read and write operations associated with the plurality of clients, decrementing and incrementing ones of a plurality of counters wherein at least one counter is associated with each of the plurality of clients.

14. The method of claim 10, comprising:
  programming a target bandwidth in the interface component;
  measuring a bandwidth in the interface component; and
  generating a priority value according to a difference between the programmed target bandwidth and the measured bandwidth.

15. The method of claim 10, comprising:
  programming a target latency in the interface component;
  measuring a latency in the interface component; and
  generating a priority value according to a difference between the programmed target latency and the measured latency.

16. A non-transitory computer readable medium containing instructions to control at least one computing device, the instructions including software code portions to implement a method, the acts of the method comprising:
  establishing a plurality of virtual channels in a logical network, the plurality of virtual channels including a first set of internal virtual channels in an interface component and a second set of system virtual channels in an IP block, the IP block associated with a plurality of clients;
  arbitrating data passed between ones of the plurality of clients by applying an arbitration procedure to a plurality of data transfers communicated via the same internal virtual channel, each data transfer associated with a different client;
  associating each virtual channel of the plurality of virtual channels with a designated quality of service logic block; and
  associating each individual client of the plurality of clients with an individual service mapper logic unit wherein the arbitrating is based on selection information provided by one of the designated quality of service logic blocks that prioritizes one of the plurality of clients.

17. The non-transitory computer readable medium of claim 16, wherein the acts of the method further comprise:
  providing the plurality of virtual channels as a first set of virtual channels in the interface component cooperating with a second set of virtual channels in the IP block;
  providing first client/virtual channel mappings to the first set of virtual channels in the interface component;
  providing second client/virtual channel mappings to the second set of virtual channels in the IP block, wherein the first client/virtual channel mappings and the second client/virtual channel mappings are decoupled from one another and programmed separately; and
  mapping at least one client onto a first one of the plurality of virtual channels, the mapping according to at least one of the first and second client/virtual channel maps.

18. The non-transitory computer readable medium of claim 16, wherein the arbitration procedure is a weighted least recently used (WLRU) arbitration procedure.

19. The non-transitory computer readable medium of claim 18, wherein the acts of the method further comprise:
  dynamically re-programming a plurality of registers associated with the WLRU arbitration procedure, wherein ones of the plurality of registers are associated with at least one of a bandwidth and a target latency.

* * * * *